March 20, 1928. 1,663,395
K. T. TANAKA
RAKE
Filed May 26, 1927
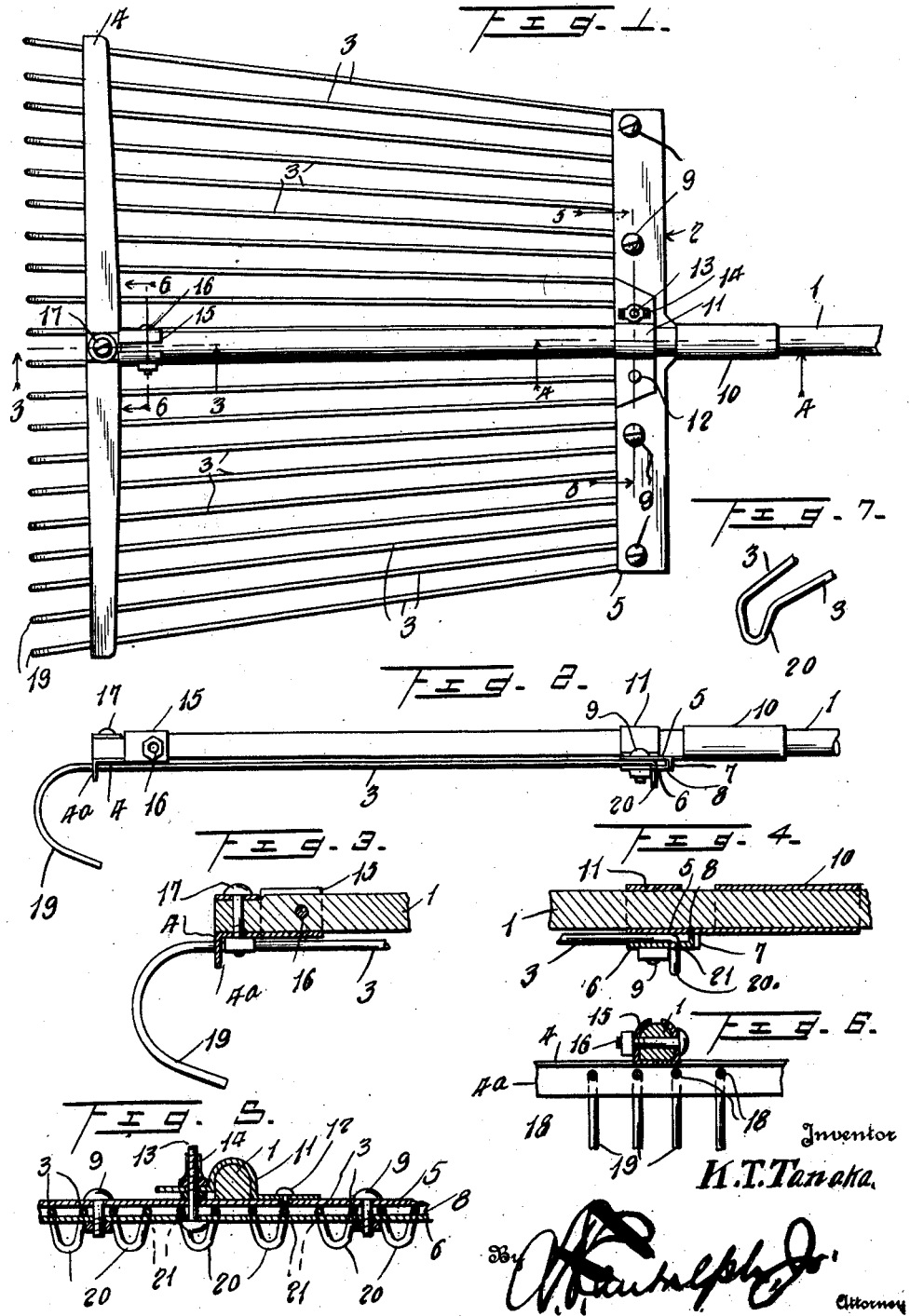

Patented Mar. 20, 1928.

1,663,395

UNITED STATES PATENT OFFICE.

KAY T. TANAKA, OF SALT LAKE CITY, UTAH.

RAKE.

Application filed May 26, 1927. Serial No. 194,341.

This invention relates to improvements in the rake forming the subject-matter of my U. S. Patent 1,149,098, granted August 3, 1915, and comprising a head fixed to the handle, rods connected at their rear ends to the head and provided at their front ends with teeth, and a spreading bar slidably mounted on the handle and operatively connected to the teeth.

The present invention has for one of its objects to provide a rake of this character wherein the head shall be slidably mounted on the handle and the spreading bar fixed to the handle, whereby to permit the teeth to be more readily spaced the required distance apart.

A further object of the invention is to provide a rake of the character stated wherein the head and spreading bar shall be of novel and improved construction, wherein the teeth carrying rods shall be secured to the head in a novel and improved manner, and wherein novel and improved means shall be employed to secure the head and spreading bar to the handle.

A still further object of the invention is to provide a rake of the character stated which shall embody novel means for securing the head on the handle against casual movement with respect thereto.

With the foregoing and other objects in view, the nature of which will become apparent as the description proceeds, the invention consists of the construction, combination and arrangement of parts hereinafter fully described and claimed, and illustrated in the accompanying drawing, wherein:

Figure 1 is a top plan view of the rake,

Figure 2 is a view in side elevation of the rake,

Figure 3 is a sectional view taken on the plane indicated by the line 3—3 of Figure 1, Figure 4 is a sectional view taken on the plane indicated by the line 4—4 of Figure 1, Figure 5 is a sectional view taken on the plane indicated by the line 5—5 of Figure 1, Figure 6 is a similar view taken on the plane indicated by the line 6—6 of Figure 1, and Figure 7 is a perspective view illustrating the manner in which the rear ends of each pair of the teeth carrying rods are connected together and formed to provide an anchor by which they are connected to the head.

Referring in detail to the drawing, 1 designates the handle, 2 the head, 3 the teeth carrying rods, and 4 the spreading bar of the rake. The head 2 consists of an upper plate 5 and a lower plate 6 which are provided at their rear edges with contacting flanges 7 and 8, respectively, and are connected together by bolts 9. The head 2 is slidably mounted on the handle 1 through the medium of a sleeve 10 which is formed integrally with the upper plate 5 of the head 2. A clamp 11 which is secured to the head 2 by a rivet 12 and a bolt 13 provided with a winged nut 14, provides means through the medium of which the head is fixed in adjusted position on the handle 1. The head 2 and the clamp 11 contact with opposite sides of the handle 1, and to secure the head in adjusted position it is only necessary to draw the clamp in the direction of the handle by turning up the winged nut 14.

The spreading bar 4 is of angular formation, and is secured to the forward end of the handle 1 by a split sleeve 15 formed integrally with the spreading bar, a bolt 16 passing through the sleeve and the handle, and a bolt 17 through the handle and the spreading bar. The downwardly extending member 4ᵃ of the spreading bar 4 is provided with openings 18 through which the teeth carrying rods 3 slidably pas.

The teeth carrying rods 3 are made of resilient material, and have their forward ends curved downwardly and rearwardly to provide teeth 19. The rods 3 are arranged in pairs, and the rear ends of the respective pairs are connected and turned downwardly to provide anchors 20. The rear ends of the rods 3 are positioned between the plates 5 and 6 of the head 2, and the anchors 20 pass through openings 21 in the plate 6. It will thus be seen that the rear ends of the rods 3 are not only clamped between the head plates 5 and 6 but are also anchored to the head plate 6, and that as the result a strong connection is established between the rods and the head 2.

The spreading bar 4 is of greater length than the head 2, and the rod receiving openings 18 in the spreading bar are spaced apart for a greater distance than are the rod receiving openings 21 in the head plate 6, with the result that the forward end portions of the rods will be spread apart when the head 2 is moved forwardly on the handle 1 and with the result that the forward end portions of the rods will be drawn together when the head is moved rearwardly on the handle. The head 2 may be readily adjusted on the handle 1 after loosening the nut 14, and the sleeve 10 is adapted to be employed as a hand grip when adjusting the head. After the head 2 has been adjusted, the nut 14 is tightened to fix it in adjusted position.

From the foregoing and accompanying drawing, it will be apparent that the effective width of the rake may be varied at will and in a convenient manner. It will also be understood that a strong and durable connection is established between the head 2 and the handle 1, between the teeth carrying rods 3 and the head, and between the spreading bar 4 and the handle.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A rake comprising a handle, a spreading bar secured to the handle and provided with openings, a head slidably mounted on the handle for adjustment with respect to the spreading bar and embodying connected upper and lower plates, said lower plate being provided with openings, means for securing the head in adjusted position on the handle, teeth carrying rods slidably passing through the openings in the spreading bar and having their rear ends positioned between the head plates and provided at said ends with angular members passing through the openings in said lower head plate.

2. A rake comprising a handle, a spreading bar fixed to the handle, a sleeve slidably mounted on the handle for adjustment with respect to the spreading bar, a head carried by the sleeve and contacting with one side of the handle, a clamp carried by the head and contacting with the opposite side of the handle, means by which the clamp may be drawn in the direction of the handle to secure the head and sleeve in adjusted position on the handle, and teeth carrying rods fixed to the head and slidably associated with the spreading bar.

In testimony whereof I affix my signature.

KAY T. TANAKA.